July 19, 1960 D. R. CONGUISTI ET AL 2,945,776
POTTING COMPOSITION AND PROCESS
Filed Dec. 20, 1957
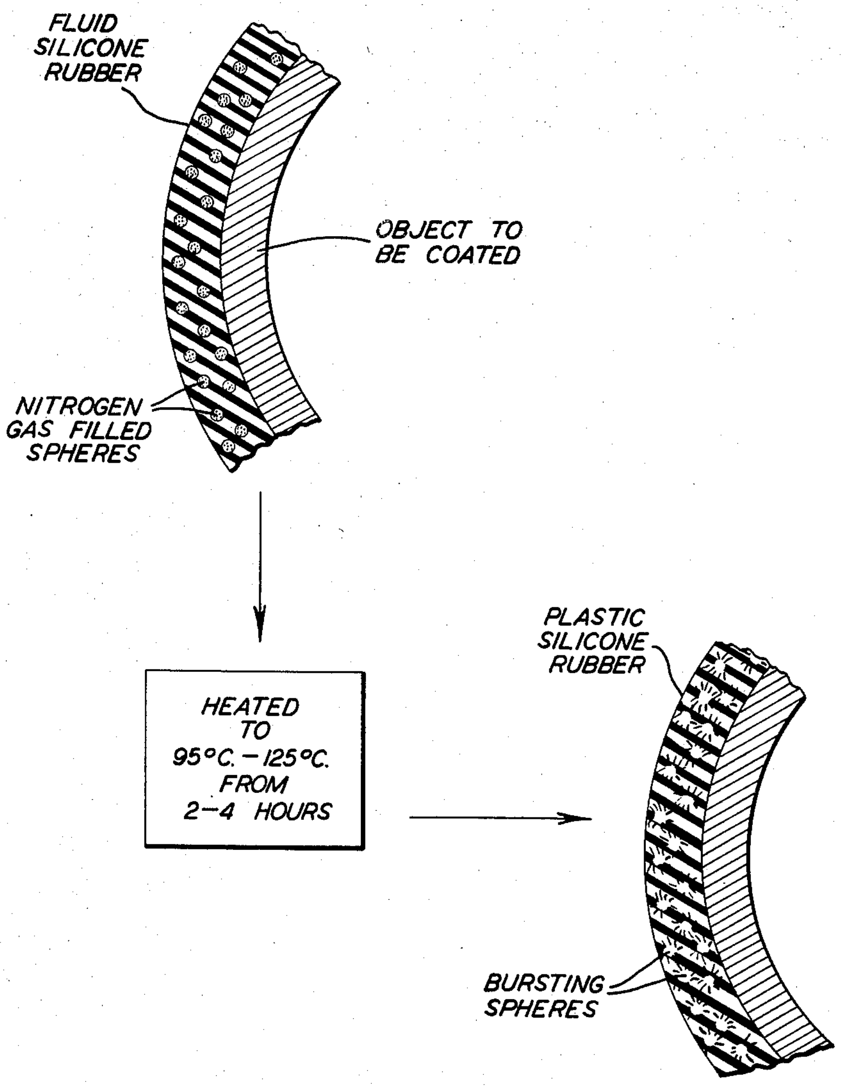
INVENTORS.
DOMINICK R. CONGUISTI
DONALD J. MULLANE
BY George W. Price
ATTORNEY 2,945,776
Patented July 19, 1960

2,945,776

POTTING COMPOSITION AND PROCESS

Dominick R. Conguisti, Dumont, and Donald J. Mullane, Garfield, N.J., assignors to ACF Industries, Incorporated, New York, N.Y., a corporation of New Jersey Filed Dec. 20, 1957, Ser. No. 704,019

4 Claims. (Cl. 117—201)

This invention relates to potting and encapsulating processes and compositions.

As it is essential that electronic components and assemblies be provided with maximum protection against the effects of mechanical and thermal shock, vibration, humidity, fungus, etc., many different potting processes and compositions have heretofore been developed for use in this art. However, such processes and compositions have not proven to be entirely satisfactory for potting electronic tubes having a high heat output, as internal stresses set up during high and low temperature cycling tend to break delicate components, or crack the protective coating material thereon.

It is, therefore, an object of the present invention to provide a potting process and composition adapted to protect electronic components externally against air, moisture, dirt, abrasion, fungus, chemicals, and thermal and physical shock.

Another object of the invention is to provide a potting process and composition adapted to maintain the desired electrical properties of electronic units over relatively large temperature ranges.

A further object of the invention is to provide a potting process and composition adapted to render delicate electronic components resistant to vibration and shock.

Another object is to provide a potting process and composition adapted to eliminate the use of metal cans and the usual brackets, terminals, and mounting strips associated therewith.

Another object is to provide a potting process and composition adapted to increase the reliability and service life of electronic components.

Another object is to provide a potting process and composition adapted to reduce internal stresses and breakage of delicate electronic components due to differentials between thermal coefficients of expansion of the electronic component and the protective coating applied thereto.

Another object of the invention resides in the provision of a potting process and composition adapted for use in applying a protective coating of relatively light weight to electronic components.

The invention embodies other objects and advantages which will be apparent from the following description and drawing.

The drawing is diagrammatically illustrative of the steps of the method and contains self-explanatory legends.

To provide a potting composition having unusual compressibility and resiliency as well as high heat resistance and excellent electrical insulating characteristics, hollow synthetic resin spheres containing sealed-in gas, which is essentially nitrogen, are mixed into a fluid silicone rubber compound having the consistency of cold molasses.

The plastic silicone rubber composition is then applied to an electronic component by dipping, brushing, or by a sealant gun until the component is completely coated.

The coated electronic component is then heated in an oven at a temperature of from 95° C. to 125° C. for a period of from 2 to 4 hours to cure the coating composition and to expand the gas contained in the hollow spheres until they burst, to thereby form a plastic silicone rubber composition having gas cells formed therein.

After curing, the coated electronic component is preferably encapsulated within a suitable epoxy resin, due to the low shrinkage and good adhesion and mechanical strength of such resins, but it is obvious that other types of resins, well known in this art, may be used, if desired.

Various silicone rubber compounds are now being sold by Dow Corning Corporation, Midland, Michigan, in accordance with Patent 2,568,672. General Electric Company sells a silicone rubber compound "SE-100-S" adapted to be diluted with toluene and combined with hollow gas-filled spheres in the following proportions:

1 part by weight of spheres,
10 parts by weight of silicone rubber.

The hollow gas-filled spheres are made in accordance with Patent 2,101,635 and sold by the Bakelite Corporation, New York, N.Y. The spheres may comprise, for example, phenol-formaldehyde resins having an average diameter of 0.0017 inch, a bulk density of 3 to 5 lbs. per cu. ft., and an actual sphere density of 12 lbs. per cu. ft. They are of lightweight, hollow structure, spherical shape, and containing sealed-in gas which is essentially nitrogen. It will be understood that the spheres may be formed of other resins, or of different diameters, as set forth in the above-mentioned patent.

After potting and encapsulation of an electronic component in the manner thus described, it will be noted that the component is protected externally from moisture, dirt, abrasion, chemicals and physical shock. It will further be noted that the provision of gas cells in the silicone rubber potting composition renders the composition expandible or compressible to thereby minimize or eliminate internal stresses which tend to break delicate components, such as electronic tubes. The potting composition also provides excellent dielectric properties, oxidation resistance, and flexibility over a temperature range of from —60° to 500° F.

It will also be noted that the potted component may be encapsulated within thermosetting casting resins having relatively high exotherm temperatures during cure, as the potting composition is not impaired by such temperatures, and permits shrinkage of the resin during cure without cracking thereof, or damage to delicate electronic components encapsulated therein.

We claim:

1. The method of potting an electronic component which comprises, mixing hollow gas-filled resinous spheres with a fluid silicone rubber compound to form a plastic potting composition having gas cells therein, coating the component with the plastic potting composition, heating the coated component in an oven to cure the potting composition to expand the gas within said spheres until they burst, and encapsulating said coated component in a resin.

2. The method of potting an electronic component which comprises, mixing hollow gas-filled resinous spheres with a fluid silicone rubber compound to form a plastic potting composition having gas cells therein, coating the component with the plastic potting composition, and heating the coated component in an oven to a temperature of from 95° C. to 125° C. for from 2 to 4 hours to cure the potting composition and to expand the gas within said spheres until they burst.

3. The method of potting an electronic component which comprises, mixing one part by weight of hollow gas-filled resinous spheres with ten parts by weight of a fluid silicone rubber compound to form a plastic potting composition having gas cells therein, coating the component with the plastic potting composition, and heating the coated component in an oven to a temperature above 95° C. to cure the potting composition and to expand the gas within said spheres until they burst.

4. The method of potting an electronic component which comprises, mixing hollow gas-filled phenol-formaldehyde spheres with a fluid silicone rubber compound to thereby form a plastic potting composition having gas cells therein, coating the component with the plastic potting composition, and heating the coated component in an oven to a temperature above 95° C. to cure the potting composition and to expand the gas within the spheres until they burst, and encapsulating said coated component within a resin.

References Cited in the file of this patent

UNITED STATES PATENTS

| | | |
|---|---|---|
| 2,101,635 | Bender | Dec. 7, 1937 |
| 2,797,201 | Veatch et al. | June 25, 1957 |
| 2,806,509 | Bozzacco et al. | Sept. 17, 1957 |
| 2,806,772 | Robie | Sept. 17, 1957 |